(12) United States Patent
Repucci et al.

(10) Patent No.: US 7,409,321 B2
(45) Date of Patent: *Aug. 5, 2008

(54) METHOD AND SYSTEM FOR ANALYZING MULTI-VARIATE DATA USING CANONICAL DECOMPOSITION

(75) Inventors: Michael Repucci, New York, NY (US); Jonathan Victor, New York, NY (US); Nicholas Schiff, New York, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/463,728

(22) Filed: Aug. 10, 2006

(65) Prior Publication Data

US 2007/0005391 A1 Jan. 4, 2007

Related U.S. Application Data

(63) Continuation of application No. 10/332,478, filed as application No. PCT/US01/21745 on Jul. 11, 2001, now Pat. No. 7,171,339.

(60) Provisional application No. 60/218,354, filed on Jul. 12, 2000.

(51) Int. Cl.
*G06F 15/00* (2006.01)

(52) U.S. Cl. .................................................. 702/189

(58) Field of Classification Search ............... 702/179, 702/182, 189, 190, 196; 707/100, 101, 104.1
See application file for complete search history.

(56) References Cited

U.S. PATENT DOCUMENTS

| 4,216,531 | A | * | 8/1980 | Chiu | 708/625 |
|---|---|---|---|---|---|
| 5,159,249 | A | | 10/1992 | Megherbi | 318/568.1 |
| 5,282,474 | A | | 2/1994 | Valdes Sosa et al. | 600/483 |
| 5,494,032 | A | | 2/1996 | Robinson et al. | 600/323 |
| 5,857,462 | A | | 1/1999 | Thomas et al. | 600/310 |
| 5,912,739 | A | | 6/1999 | Fowler et al. | 356/613 |
| 6,088,659 | A | | 7/2000 | Kelley et al. | 706/62 |
| 7,171,339 | B2 | * | 1/2007 | Repucci et al. | 702/189 |
| 2003/0225743 | A1 | * | 12/2003 | Inokuchi | 707/3 |
| 2004/0252870 | A1 | * | 12/2004 | Reeves et al. | 382/128 |

OTHER PUBLICATIONS

International Search Report dated Nov. 6, 2001 issued in counterpart international application No. PCT/US01/21745.

* cited by examiner

*Primary Examiner*—Michael P Nghiem
(74) *Attorney, Agent, or Firm*—Darby & Darby

(57) ABSTRACT

A canonical decomposition (CD) method that includes building a multi-variate linear autoregressive ("MLAR") model from an original data set or from a reduced set derived by data reduction methods from the original data set. The MLAR analysis is followed by seeking a coordinate transformation of the MLAR model to obtain the best possible match with one or more canonical forms representing relationships among components. For multi-variate data with a truly hierarchical structure, CD accurately extracts the underlying sources of the system.

15 Claims, 7 Drawing Sheets

Fig. 1A
| 1.41 | 0.04 | 0.17 | -0.81 | -0.2 | -1.02 |
|------|------|------|-------|------|-------|
| 0    | 1.69 | 0.51 | 0     | -0.81| -1.38 |
| 0    | 0    | 0.67 | 0     | 0    | -0.81 |
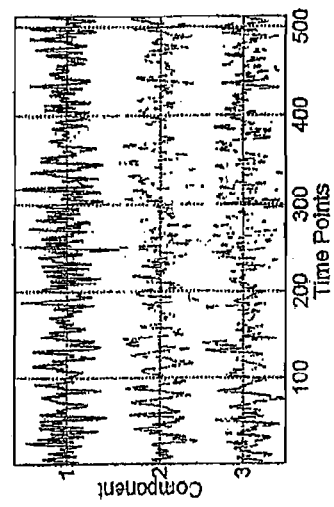
Fig. 1B
Fig. 1C
| 1.37 | 0.01 | -0.13 | -0.76 | -0.21 | 0.96  |
|------|------|-------|-------|-------|-------|
| 0    | 1.77 | -0.58 | 0     | -0.91 | 1.34  |
| 0    | 0    | 0.67  | 0.01  | 0.03  | -0.82 |
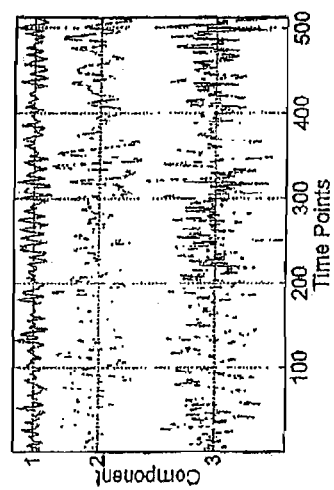
Fig. 1D
Fig. 1E Prior Art
| 1.57  | -0.1 | -0.09 | -1.56 | -0.41 | 0.05  |
|-------|------|-------|-------|-------|-------|
| -1.36 | 0.83 | 0.16  | 1.05  | -0.18 | -0.09 |
| -0.16 | 0    | 1.41  | -0.01 | 0.03  | -0.81 |
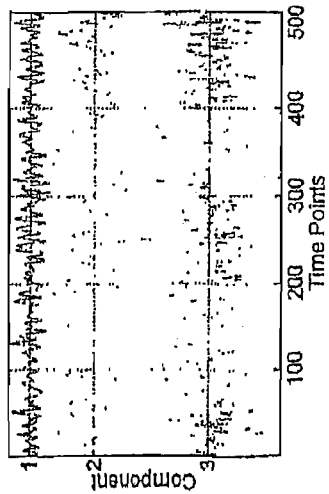
Fig. 1F Prior Art

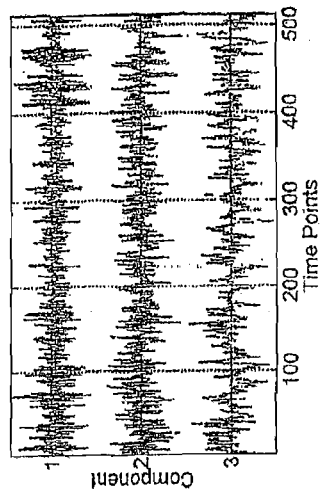
Fig. 3A / Fig. 3B
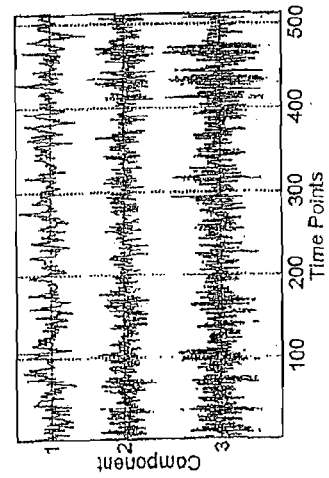
Fig. 3C / Fig. 3D
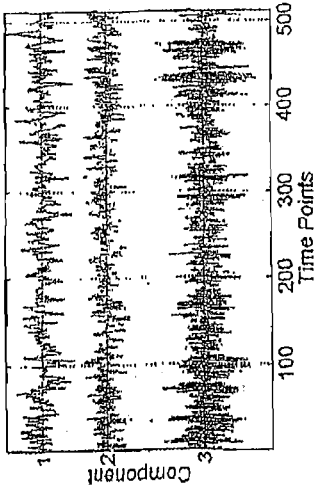
Fig. 3E Prior Art / Fig. 3F Prior Art

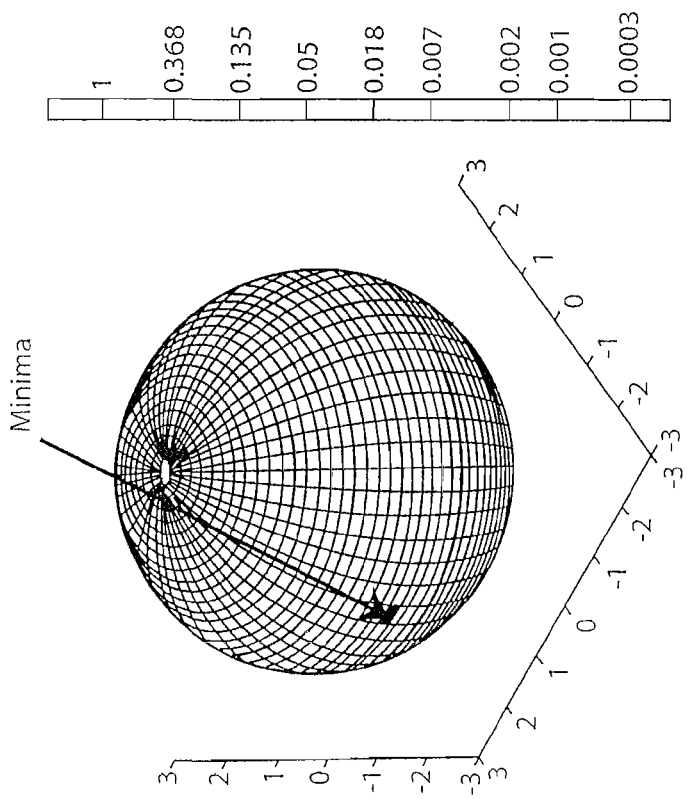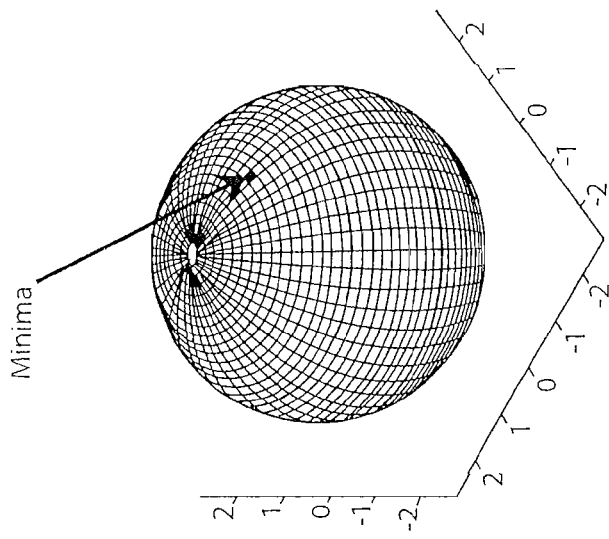
Fig. 4

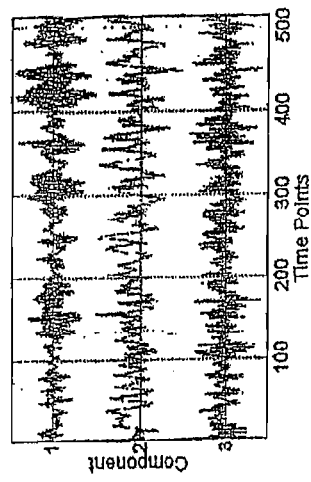
Fig. 5A
Fig. 5B
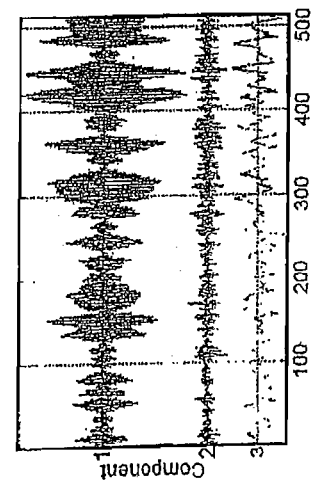
Fig. 5C
Fig. 5D
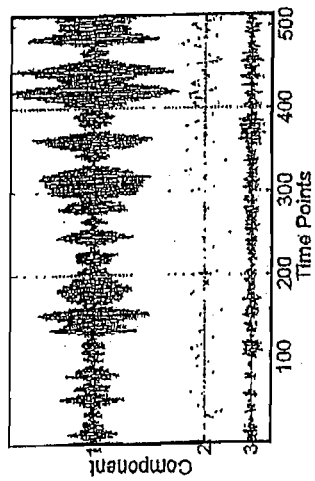
Fig. 5E Prior Art
Fig. 5F Prior Art

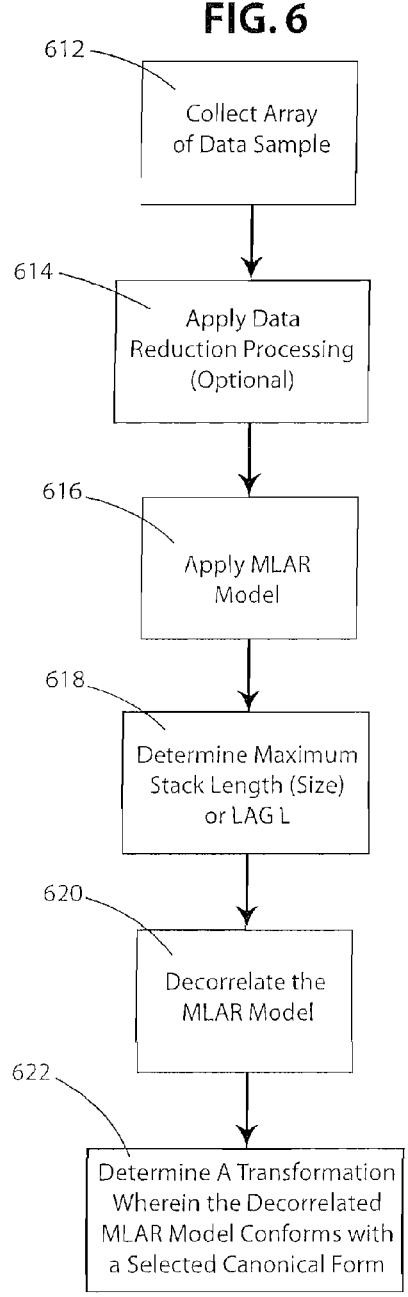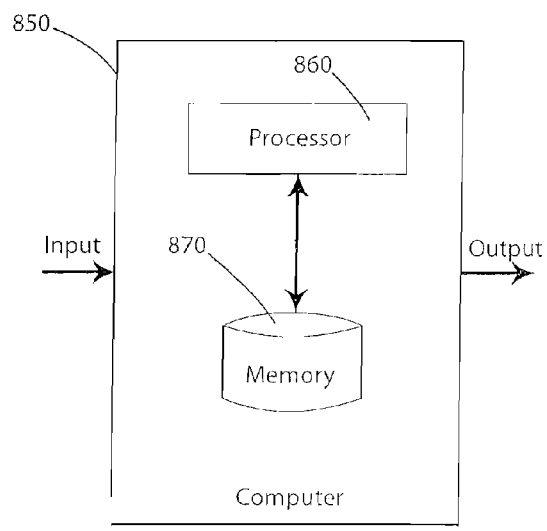

Patient 1, Seizure 1

Patient 2, Seizure 1

Patient 1, Seizure 2

Patient 2, Seizure 2

Patient 1, Seizure 3

Patient 2, Seizure 3

METHOD AND SYSTEM FOR ANALYZING MULTI-VARIATE DATA USING CANONICAL DECOMPOSITION

CROSS-RELATED APPLICATION

This application is a continuation of U.S. Ser. No. 10/332,478, filed Sep. 15, 2003, now U.S. Pat. No. 7,171,339, which is a national phase of PCT Application No. PCT/US01/21745, filed Jul. 11, 2001, which was published in English as International Publication No. WO 02/03858 and claims the benefit of U.S. Provisional Application No. 60/218,354, filed Jul. 12, 2000, and are hereby incorporated by reference in their entirety.

FIELD OF THE INVENTION

The present invention relates to the signal analysis of multi-variate data in general and, more particularly, to a method and a system for analyzing multi-variate data to determine the dynamic relationship among underlying components and their relationship to underlying sources.

BACKGROUND OF THE INVENTION

Multi-variate time series data is abundant in a variety of systems. For example, such data is found in biomedical systems, from spatiotemporal signals such as the electroencephalogram (EEG), to temporal patterns of gene expression observed with gene chip arrays. Multi-variate or multi-channel data refers to measurements of multiple variables or channels (of data) across a common variable (i.e., time). Some examples of multi-variate data include: 16 channels representing 16 different locations on a patient's scalp to measure neural activity, expression levels of 40 different genes, or the brightness of pixels in the rows of an image. While many approaches exist for the analysis of multi-variate data, the most common approach involves first decomposing the data into several independent time series (e.g., using Principal Components Analysis (PCA)). The decomposed time series data is then separately analyzed using e.g., autoregressive modeling, spectral analysis, and other linear and nonlinear techniques. Once the data has been decomposed and analyzed, one can speculate about the nature of the underlying sources of the multi-variate time (temporal) series data.

However, this prior art technique is constrained in that decomposition necessarily assumes that the underlying sources are independent. Accordingly, the prior art technique is not appropriate for real systems in which the underlying sources include independent sources and sources with dependent or dynamic relationships. Dynamic relationships are dependencies among sources or within individual sources that change with respect to a common variable, e.g., time.

Conventional decomposition techniques include PCA, alone or in combination with Varimax Rotations (VR), independent components analysis (ICA), and/or non-negative matrix factorization (NMF). These methods ignore, or do not make use of time series data's causality. Causality is an attribute possessed by some systems, and indicates that one or more components of the system may be the cause of variation in another, perhaps overlapping, set of components. For example, a system that evolves in time possesses causality, in that its behavior at one time may cause variations at a later time. On the other hand, measurements from photographic snapshots of randomly chosen images typically do not possess causality. Another example of causality is that, the value of a stock across time depends on ("is caused by") what happened in the past. PCA assumes that the sources are mathematically independent. In the sense used by PCA, such mathematically independent sources are referred to as orthogonal sources. ICA requires independence of sources in an information-theoretic sense. Sources which are independent in an information-theoretic sense are those in which the value of one source does not provide any information with respect to determining the value of any other source. The Varimax rotation variation seeks a transformation that maximizes the sum of the variances in each extracted source. NMF attempts to find sources whose weights are non-negative (i.e., only adding, not subtracting, of the sources is allowed).

Although the above conventional techniques are suitable for image analysis or for separating independent time series data, they are unsuitable for multi-variate series systems that originate from dynamical interrelated sources via a mixing process. In particular, these conventional methods assume that the order of data points is irrelevant and thus, produce equivalent results for the original, time-reversed, or randomly shuffled data.

Models for the analysis of multi-variate time series data using multi-variate linear autoregression (MLAR) are also known in the art. One such model is described in Granger, C. W. J., "Investigating causal relations by econometric models and cross-spectral methods", Econometrica 37(3) (1969), pp. 424-438, herein incorporated by reference. However, although these methods make use of causality, they do not address the problem of identifying sources and can only be applied when the sources are known, i.e., under the assumption that the observed data series are the sources and that no mixing occurs.

Accordingly, it would be beneficial to design a multi-variate data analysis system and method which accounts not only for the causal relationships of the data sources, but also accounts for a mixing between the sources and the observed data series.

SUMMARY OF THE INVENTION

It is an object of the present invention to provide a method and a system for analyzing multi-variate data by utilizing the dynamic relationships among different channels in a multi-channel signal. The channels are the recorded known values of some variable, while the sources are typically unknown.

The present invention, canonical decomposition (CD), is a method of determining dynamic characteristics of data that is causal and has translation-invariant statistics with respect to a variable. Initially, signals representing the data and originating from a set of components are received. The set of components are assumed to be dynamically related with each other. A set of multi-linear autoregressive coefficients of the data is calculated. The multi-linear autoregressive coefficients yield an array of square matrices, wherein each square matrix reflects the relationship among the components for a certain value of the variable. A canonical form suitable for analyzing the dynamic relationship is selected and each square matrix is transformed to a substantially canonical form corresponding to the selected canonical form, yielding a set of canonical form matrices representing a transformation of the components. The selected canonical form and transformed components are then analyzed to determine dynamic characteristics of the data with respect to the variable.

The invention also relates to a system for determining dynamic characteristics of data that is causal and has translation-invariant statistics with respect to a variable, in accordance with the method described above.

One embodiment of the present invention resolves the multi-variate data into hierarchically dependent underlying sources. The embodiment assumes that each source is driven by noise and other sources to which it is subordinate in the source hierarchy. Implementation of this type of canonical decomposition (CD) combines principal components analysis (PCA), autoregressive modeling, and a search strategy which determines hierarchical relationships among the sources using orthogonal rotations or transformations. For systems with such a hierarchical structure, having both dependent and independent sources, CD accurately extracts the underlying sources, whereas PCA or ICA are limited exclusively to independent source analysis.

A CD model in accordance with the present invention uses the causal (forward advancing with respect to a variable such as time) dynamic content of multi-variate data As described in detail below, the CD method of the present invention takes advantage of the signal dynamics, and thus achieves improved resolution of the sources of multi-variate data with dynamic interrelationships.

It has been discovered that if a system conforms to a hierarchical structure and a multi-variate autoregressive model is applied that includes sufficient terms then CD resolution is unique and will recover the hierarchically related sources. Further, the CD method of the present invention is also suitable when applied to an independent system. That is to say, if the underlying sources of the system are truly independent, then the CD algorithm will uncover such sources.

It is appreciated that certain multi-variate data may not be reducible to a hierarchical form. For example, a system with reciprocally related sources may not be reducible to a hierarchical form. In such cases, the present invention may be used as a basis for identifying more complex canonical forms or structures to model or describe more complex systems.

A CD model in accordance with the present invention includes building a multi-variate linear autoregressive ("MLAR") model from an original data set or from PCA-derived components of the original data set, depending on the embodiment. The MLAR analysis is followed by seeking a coordinate transformation or rotation of the MLAR model to obtain the best possible match with one or more canonical forms of interrelationship among components. It has been demonstrated that for simulated multi-variate time series data with a truly hierarchical structure, CD accurately extracts the underlying sources of the system.

BRIEF DESCRIPTION OF THE ILLUSTRATIVE EMBODIMENTS

The foregoing and other features of the present invention will be more readily apparent from the following detailed description and drawings of illustrative embodiments of the invention wherein like reference numbers refer to similar elements throughout the several views and in which:

FIG. 1A is an array of exemplary coefficients for a two lag, 3 component hierarchical MLAR model;

FIG. 1B is the time series associated with the model coefficients in FIG. 1A;

FIG. 1C is an array of exemplary coefficients for a two lag 3 component hierarchical MLAR model resolved in accordance with the CD method of the present invention;

FIG. 1D is the times series associated with the model coefficients in FIG. 1C;

FIG. 1E is an array of exemplary coefficients for a two lag, 3 component hierarchical MLAR model resolved in accordance with the prior art PCA method;

FIG. 1F is the times series associated with the model coefficient in FIG. 1E;

FIG. 3A is an array of exemplary coefficients for a one lag, 3 component hierarchical MLAR model;

FIG. 3B is the time series associated with the model coefficients in FIG. 3A;

FIG. 3C is an array of exemplary coefficients for a one lag, 3 component hierarchical MLAR model resolved in accordance with the CD method of the present invention;

FIG. 3D is the time series associated with the MLAR model coefficients in FIG. 3C;

FIG. 3E is an array of exemplary coefficients for a one lag, 3 component hierarchical model resolved in accordance with the prior art PCA method;

FIG. 3F is the time series associated with the MLAR model coefficients in FIG. 3E;

FIGS. 4A & 4B are spherical representations of minimization of residuals for the CD resolved system of FIG. 3C in rotation space;

FIG. 5A is an array of exemplary coefficients for a two lag, 3 component MLAR model in which the simulated sources are independent;

FIG. 5B is the time series associated with the MLAR model coefficients in FIG. 5A;

FIG. 5C is an array of exemplary coefficients for a two lag, 3 component independent MLAR model resolved in accordance with the CD method of the present invention;

FIG. 5D is the time series associated with the MLAR model coefficients in FIG. 5C;

FIG. 5E is an array of exemplary coefficients for a two lag, 3 component prior art PCA-derived resolved components;

FIG. 5F is the time series associated with the MLAR model coefficients in FIG. 5E;

FIG. 6 is a flow diagram illustrating the method of the present embodiment;

FIG. 8 is a diagram illustrating a system overview in accordance with the present embodiment.

DETAILED DESCRIPTION OF THE ILLUSTRATIVE EMBODIMENTS

Figure 2:
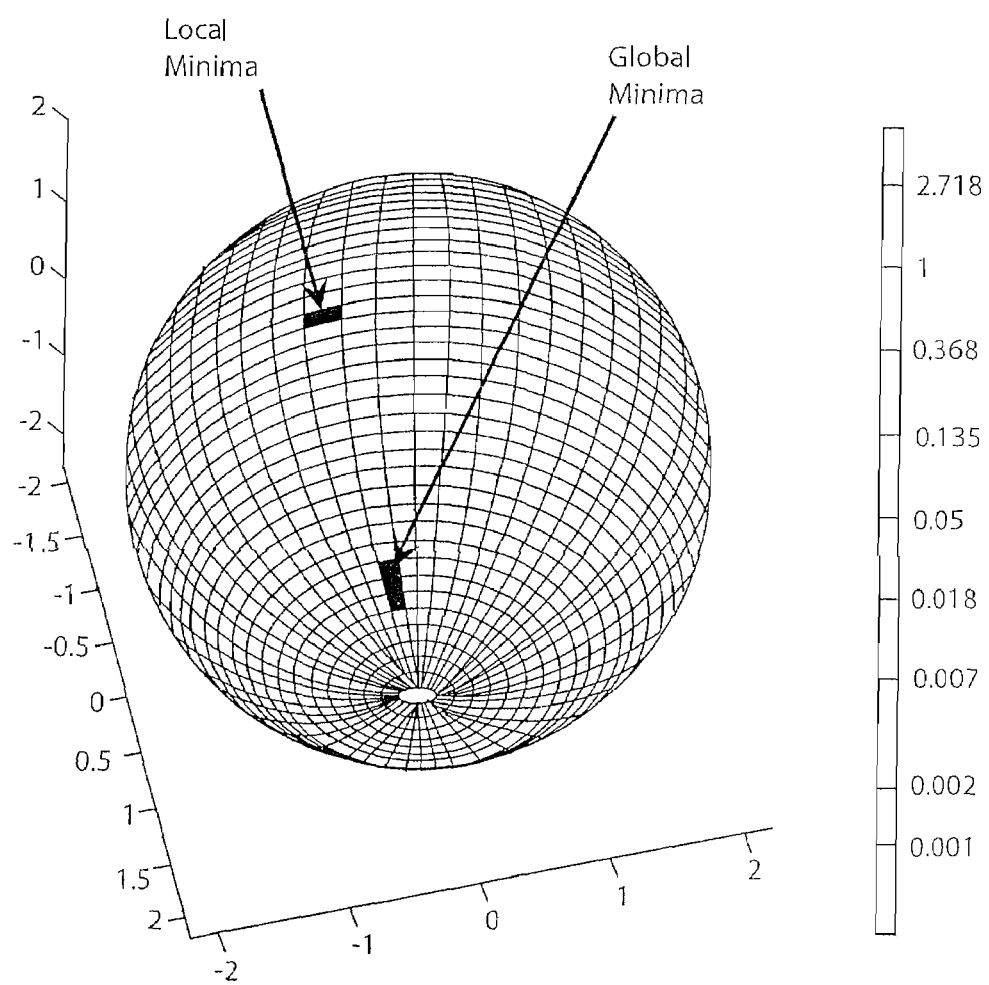
FIG. 2 is a spherical representation of minimization of residuals for the CD resolved system of FIG. 1C in rotation space.
Figures 7A, 7B:
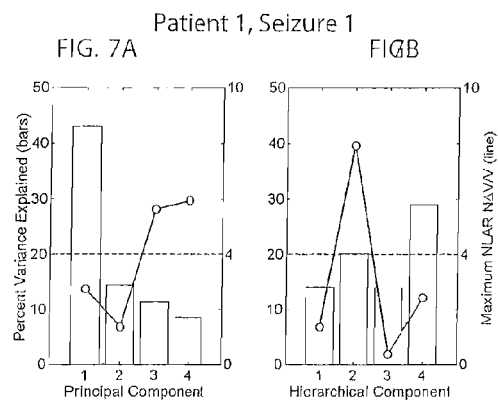
FIG. 7A is the MLAR analysis of Patient 1, during Seizure 1 using PCA resolved components.
FIG. 7B is the NLAR analysis of Patient 1, during Seizure 1 using HD resolved components.
Figures 7G, 7H:
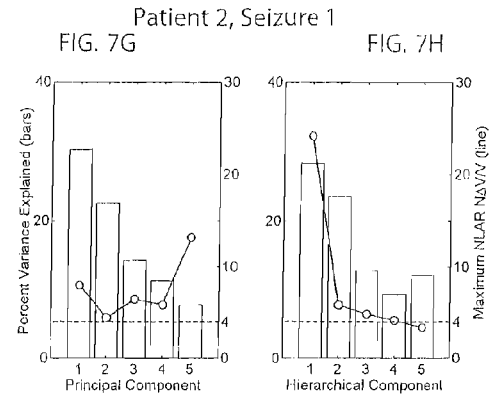
FIG. 7G is the NLAR analysis of Patient 2, during Seizure 1 using PCA resolved components.
FIG. 7H is the NLAR analysis of Patient 2, during Seizure 1 using HD resolved components.
Figures 7C, 7D:
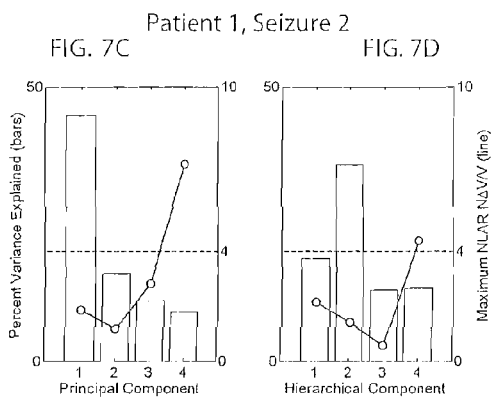
FIG. 7C is the is the NLAR analysis of Patient 1, during Seizure 2 using PCA resolved components.
FIG. 7D is the NLAR analysis of Patient 1, during Seizure 2 using HD resolved components.
Figures 7I, 7J:
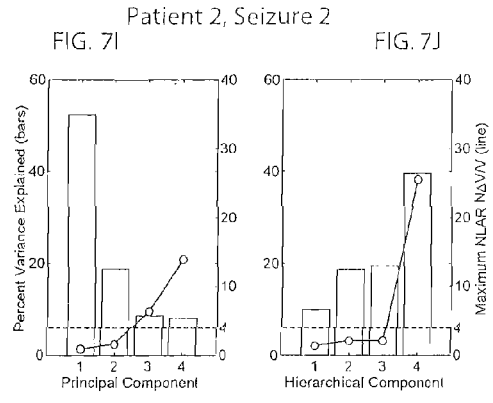
FIG. 7I is the NLAR analysis of Patient 2, during Seizure 2 using PCA resolved components.
FIG. 7J is the NLAR analysis of Patient 2, during Seizure 2 using HD resolved components.
Figures 7E, 7F:
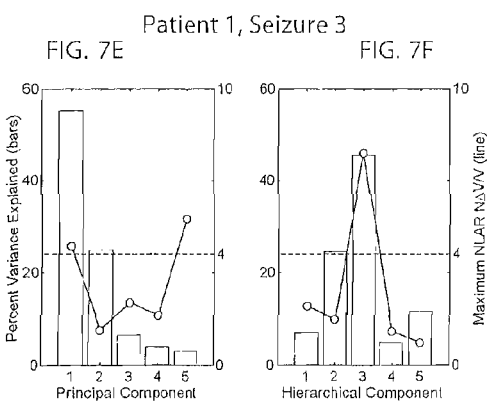
FIG. 7E is the NLAR analysis of Patient 1, during Seizure 3 using PCA resolved components.
FIG. 7F is the NLAR analysis of Patient 1, during Seizure 3 using HD resolved components.
Figures 7K, 7L:
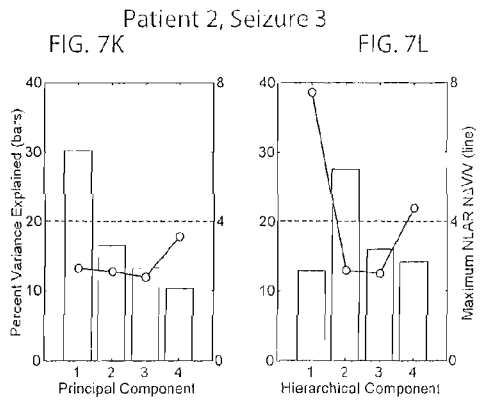
FIG. 7K is the NLAR analysis of Patient 2, during Seizure 3 using PCA resolved components.
FIG. 7L is the NLAR analysis of Patient 2, during Seizure 3 using HD resolved components.

In accordance with an aspect of present invention, multi-variate data is resolved into a plurality of hierarchically dependent underlying sources, such that, each source is driven by noise and other sources to which it is subordinate in the source hierarchy. In a preferred embodiment of the present invention, the CD method combines a data-reduction method, such as principal components analysis (PCA) or Independent Component Analysis (ICA), with autoregressive modeling, and a method for searching among orthogonal rotations or transformations to identify underlying sources that are related in a hierarchical structure. For model systems conforming to a canonical structure, CD accurately extracts dominant and subordinate underlying sources of the multi-variate data consequently providing an analysis unparalleled by prior art data reduction methods such as PCA.

The present invention may be applied to any multi-variate system which is known or suspected to have a dynamic structure. For example, CD resolves multi-variate systems in which the observed variables represent mixtures of underlying sources with hierarchical or otherwise specified canonical interrelationships. Common to each of these CD resolved systems is that the data comprising the system is causal and has translation-invariant statistics with respect to an independent variable, e.g., time.

FIG. 6 is an exemplary flowchart of the CD process in accordance with the present invention. Initially, in step 612 an array of sample data is collected. Each sample is collected and at an equivalent interval one after the other in series. The data set is "causal," that is, dependent on some variable, e.g., time or some other parameter that moves in a forward direction. The collected data form, a matrix X, whose rows (M rows one for each channel) contain the individual series, each of which is N points in length.

Once the data the original data matrix X (M×N) has been collected data reduction processing, preferably PCA, may be performed on the data in step 614 to reduce the number of components in the multi-variate data. This technique, while substantially reducing the mathematical complexity of the CD analysis is an optional step. Preferably, PCA is applied to determine if the result is advantageous in the particular circumstances.

Assuming however that the reduction processing in step 614 is performed, the original data set matrix X (M×N) is processed by PCA yielding a second matrix Y (M×N), comprising linear combinations of P orthogonal principal sources, $$Y = C^T W T \quad \text{(Equation 1)}$$

where C is a matrix of dimension P×M whose rows are spatial components that represent the contributions by each decomposed component to each channel of the original input (the multi-variate data). T is a matrix of dimension P×N whose rows are temporal components, and W is a diagonal matrix of eigenvalues of dimension P×P whose elements, squared, are an amount of explained vaiance contributed by each principal source. For any number of sources P (P≦min(M, N)), PCA minimizes unexplained variance between X and Y $$R_{PCA} = tr[(X-Y)(X-Y)^T] \quad \text{(Equation 2)}$$

wherein $R_{PCA}$ is the residual matrix and "tr" is the trace.

This decomposition of the original data set matrix X into orthogonal (i.e., independent or instantaneously uncorrelated) components C and T, however, is not unique. Replacing the temporal components T by GT (for any nonsingular linear transformation G) and, accordingly, the spatial components C by $W^1(G^{-1})^T WC$, leaves the data reduced matrix Y unchanged:

$$[(W^{-1}(G^{-1})^T WC)^T] W[GT] = C^T W G^{-1} W G T = C^T W T = Y,$$

where basic properties of the transpose are used, and W is a diagonal matrix. The specific, but arbitrary, solution identified by PCA consists of matrices C and T whose rows are orthonormal, and a matrix W whose diagonal elements are non-negative and ordered from largest to smallest, left to right and top to bottom, along the diagonal. The resulting matrix is arbitrary and non-unique. Resolving the non-uniqueness of the decomposition obtained with equation (1) is the focus of the remainder of the CD analysis (i.e., finding a unique, non-arbitrary transformation G).

Data reduction in step 614 removes instrumental noise from the signal and accordingly, reduces the signal dimensionality by reducing the number of components or sources. PCA removes the instrumental noise without sacrificing necessary system information such as dynamic fluctuations.

Next in step 616, a Multi-variate Linear Autoregressive ("MLAR") model of the temporal components in matrix T is created. After the MLAR model is applied, the invention imposes two conditions on the components. The first condition is that noise (i.e., residual values between the observed behavior and the MLAR model) in each component is independent and of equal magnitude. This ensures that the stochastic components of the sources are independent, and arbitrarily sets a scale for the size of each source. The MLAR model is implemented in a single step, and can always be achieved, independent of the dynamics of the system. The second condition, seeks hierarchical relationship among components.

The MLAR model of the temporal components in matrix T is in a form equivalent to that proposed by Gersh, W. and Yonemoto, J., "Parametic Time Series Models for Multi-variate EEG Analysis," Comp. Biomed. Res. 10:113-125 (1977), herein incorporated by reference. Other MLAR modeling methods are contemplated and within the scope of the present invention. There are a total of P temporal components. Each element $T_{p,n}$, the $n^{th}$ sample of the $p^{th}$ component, is modeled by an L-term autoregression represented as follows:

$$T_{p,n} = R_{p,n} + \mu_p + \sum_{q=1}^{P} \sum_{l=1}^{L} A_{q,p,l} T_{q,n-l} \quad \text{(Equation 3)}$$

where R is a matrix of residual values of dimension P×N, $u_p$ is the mean value of the $p^{th}$ component, and A is a P×P×L three-dimensional array of MLAR model coefficients of dimension P×P×L. It is helpful to view the model coefficients A as a set of arrays, one for each of the time lags 1, . . . , L, each of which is a P×P square matrix. The $l^{th}$ plane or lag of the matrix of MLAR coefficients A describes the estimated influence of the signals at a time n−l, on the signal values at time n. Namely, $A_{q,p,l}$ is the influence of the $q^{th}$ component at the $l^{th}$ time lag on the current value of the $p^{th}$ component.

The MLAR model coefficients $R_{MLAR}$ are determined by minimizing the sum of the squared residual values (the innovations, $R_{p,n}$) in the MLAR model according to the following equation:

$$R_{MLAR} = \sum_{p=1}^{P} \sum_{n=1}^{N} R_{p,n}^2 \quad \text{(Equation 4)}$$

using conventional equations, such as the Yule-Walker equations described in Yule, G.U., "On the Method of Investigating Periodicities in Disturbed Series with Special Reference to Wolfer's Sunspot Numbers", Philos. Trans. R. Soc. Lond. A. 226:267-298, (1927), herein incorporated by reference. In step 618, a maximum stack length (size) or lag L is determined using conventional criteria, for example, the Akaike Criterion (AIC) as described in Akaike, H. "A new look at statistical model identification", IEEE Trans Auto Control, 19:716-723, (1974), herein incorporated by reference, is one reference of many which describes how to determine lag L. A statistical justification for determining lag L is made based on whether the amount of reduction in residual variance is sufficient to justify the inclusion of additional linear model terms. The value of lag L is typically 2, 3 or 4 lags.

Once the MLAR model has been created and the MLAR model matrices have been stacked L lags high, in step 620 various admixtures of the reduced data are considered to determine the effect on the MLAR model. The final admixture is chosen which has the effect of making the random terms in each component independent. This is known as decorrelation. As mentioned above prior art techniques resolved only arbitrary, unique or only non-unique, non-arbitrary systems, while the present invention resolves unique, multivariate data into canonically related components non-arbitrarily.

The first step in non-arbitrary resolution of the non-uniqueness of the reduced data set or original data set relies upon the matrix of innovations $R_{p,n}$ of dimension P×N. These quantities are viewed as random terms that drive the P channels of the MLAR model. Thus, if T represents distinct underlying sources, then the corresponding driving the innovations terms $R_{p,n}$, in equation (3) would be uncorrelated. For this reason, the transformed temporal components GT decorrelate $R_{p,n}$. Additionally, it is assumed that each source of innovations has equal variance. In other words, no particular source is intrinsically noisier than another. This amounts to an arbitrary choice for the variance of each source, but makes no further assumptions about the dynamic structure of the system. Under these assumptions, transformations K are sought that orthonormalize the innovations $R_{p,n}$, that is, $(KR)(KR)^T = KRR^TK^T = I$, where I is the identity matrix. One such matrix K can be obtained by dividing the rows of the eigenvectors of $RR^T$ by the square root of the corresponding eigenvalues. (The rows of the matrix K are necessarily orthogonal, since they are scalar multiples of the eigenvectors of the positive symmetric matrix $RR^T$.) The transformation K applied to equation (3) yields new temporal components T'=KT, new autoregressive coefficients $A'_l{}^T = KA_l{}^T K^{-1}$ (for l=1, ..., L, where $A_l{}^T$ denotes the transpose of $A_l$), and decorrelated, normalized innovations R'=KR. Nevertheless, this does not fully resolve the non-uniqueness problem, since pre-multiplying K by any orthogonal transformation Q (i.e., Q such that $QQ^T = Q^TQ = I$) yields an alternative matrix G=QK, for which GR is likewise decorrelated and normalized:

$$(GR)(GR)^T = (QKR)(QKR)^T = QKRR^TK^TQ^T = QIQ^T = I.$$

Once the system has been reduced, modeled, broken down into layers determined by lags L, and a matrix K chosen to decorrelate the innovations $R_{p,n}$, finally in step 622 a search is made among all orthogonal transformations to find the transformation Q which simultaneously transforms all matrices $A'_l$ as closely as possible to one or more selected canonical expressions or forms.

Some exemplary canonical forms and structures for assessing the kind of canonical structure and the degree of hierarchical structure present in any set of the MLAR coefficients are presented below. By way of example, the canonical form chosen for discussion purposes is the upper-triangular form. The upper-triangular form is described below along with some other canonical forms that can similarly be applied in accordance with the present invention.

EXAMPLES AND DEFINITIONS OF CANONICAL FORMS

In each of the illustrations, "*" indicates the presence of a non-zero matrix element in that particular location of the matrix.

Triangular Canonical Form: This is a simple hierarchy. The "prime mover" is the channel that corresponds to the top row (i.e., the channel that has a non-zero effect on all other channels and itself). Each channel is influenced by itself, and by channels that are more dominant in the hierarchy, that is, channels corresponding to a higher row of the matrix. This corresponds to a matrix with nonzero elements along the main diagonal and in locations anywhere to the right of the main diagonal.

$$T_n = \begin{pmatrix} * & * & * & \cdots & * & * \\ 0 & * & * & \cdots & * & * \\ 0 & 0 & * & \ddots & * & * \\ 0 & 0 & 0 & \ddots & \vdots & \vdots \\ \vdots & \vdots & \vdots & \ddots & * & * \\ 0 & 0 & 0 & \cdots & 0 & * \end{pmatrix} \quad \text{(Equation 5)}$$

Restricted Triangular Canonical Form: This is also a simple hierarchy. The "prime mover" is the channel that corresponds to the top row. Remaining channels are influenced only by the next-highest channel in the hierarchy. This corresponds to a matrix with nonzero elements along the main diagonal and in locations just to the right of the main diagonal.

$$R_n = \begin{pmatrix} * & * & 0 & \cdots & 0 & 0 \\ 0 & * & * & \cdots & 0 & 0 \\ 0 & 0 & * & \ddots & 0 & 0 \\ 0 & 0 & 0 & \ddots & \vdots & \vdots \\ \vdots & \vdots & \vdots & \ddots & * & * \\ 0 & 0 & 0 & \cdots & 0 & * \end{pmatrix} \quad \text{(Equation 6)}$$

Unidirectional Cyclic Canonical Form: This canonical form is not a hierarchy. There is no prime mover; each channel is influenced by itself and one adjacent channel. This corresponds to a matrix with nonzero elements along the main diagonal, and in locations just to the right of the main diagonal. In addition, in the bottom row, the element "just to the right" of the main diagonal is wrapped around to the lower left corner of the matrix.

$$C_n = \begin{pmatrix} * & * & 0 & \cdots & 0 & 0 \\ 0 & * & * & \cdots & 0 & 0 \\ 0 & 0 & * & \ddots & 0 & 0 \\ 0 & 0 & 0 & \ddots & \vdots & \vdots \\ \vdots & \vdots & \vdots & \ddots & * & * \\ * & 0 & 0 & \cdots & 0 & * \end{pmatrix} \quad \text{(Equation 7)}$$

Bidirectional Cyclic Canonical Form: This canonical form is also not a hierarchy. There is no prime mover; each channel is influenced by itself and by two adjacent channels. This corresponds to a matrix with nonzero elements along the main diagonal and in locations just to the right and just to the left of the main diagonal. In the bottom row, the element just to the right of the main diagonal is wrapped around to the lower left corner of the matrix. In the top row, the element just to the left of the main diagonal is wrapped around to the upper right corner of the matrix.

$$B_n = \begin{pmatrix} * & * & 0 & \cdots & 0 & * \\ * & * & * & \cdots & 0 & 0 \\ 0 & * & * & \ddots & 0 & 0 \\ 0 & 0 & * & \ddots & \vdots & \vdots \\ \vdots & \vdots & \vdots & \ddots & * & * \\ * & 0 & 0 & \cdots & * & * \end{pmatrix} \quad \text{(Equation 8)}$$

Diagonal Canonical Form: This canonical form corresponds to complete independence of the channels. The corresponding matrix has nonzero elements only on the diagonal.

It represents a special case in which a representation of the observed signals in terms of independent, rather than interdependent, components is sought. Even with this specialization, the method in accordance with the present invention is different from conventional data reduction methods in that it seeks components that are independent across time lags as well as with zero temporal off-set $$D_n = \begin{pmatrix} * & 0 & 0 & \cdots & 0 & 0 \\ 0 & * & 0 & \cdots & 0 & 0 \\ 0 & 0 & * & \cdots & 0 & 0 \\ 0 & 0 & 0 & \cdots & \vdots & \vdots \\ \vdots & \vdots & \vdots & \cdots & * & 0 \\ 0 & 0 & 0 & \cdots & 0 & * \end{pmatrix} \quad \text{(Equation 9)}$$

This identification of canonical forms is not exhaustive but merely illustrates the more commonly used and applicable forms. With only two channels, the full triangular form $T_n$ and the restricted triangular form $R_n$ are identical, and the unidirectional cyclic form $C_n$ and the bidirectional cyclic form $B_n$ are full matrices (and therefore not useful). Conversely, when more than three channels are available, a greater number of canonical forms can be usefully distinguished, including forms consisting of block matrices with the above elements.

An illustrative example of a block triangular canonical form is $diag(T_2, B_5)$, a form for 7 channels consisting of two independent groups, a two-channel triangular hierarchy and a 5-channel bidirectional cyclic structure. The corresponding matrix has two nonzero blocks: the upper left 2×2 elements form $T_2$, and the lower right 5×5 elements form $B_5$:

$$diag(T_2, B_5) = \begin{pmatrix} * & * & 0 & 0 & 0 & 0 & 0 \\ 0 & * & 0 & 0 & 0 & 0 & 0 \\ 0 & 0 & * & * & 0 & 0 & * \\ 0 & 0 & * & * & * & 0 & 0 \\ 0 & 0 & 0 & * & * & * & 0 \\ 0 & 0 & 0 & 0 & * & * & * \\ 0 & 0 & * & 0 & 0 & * & * \end{pmatrix} \quad \text{(Equation 10)}$$

At the point where the model is transformed, the system has reduced the non-uniqueness of the reduced data set or original data set to an arbitrary scale factor for each source. Next, transformation of the temporal components QT' is chosen which is consistent with one or more selected canonical expressions or forms. The autoregressive coefficients A' from the decorrelated MLAR model specify the dynamic interrelationships among the P components at up to all of the L lags. Accordingly, the CD algorithm seeks a transformation matrix Q of dimension P×P that simultaneously transforms all stacked matrices comprising $A'_l$ into a canonical form. While one canonical form is an upper-triangular form, other canonical forms can be equally applied, as described fierier below. The transformation matrix Q must be orthogonal so as to guarantee that the residuals $R_{MLAR}$ are unchanged and that the orthonormality of the innovations R' is preserved. The search for the transformation is further restricted by a set of rotations (i.e., det(Q)=1) which avoids arbitrary changes in the sign of an odd number of components.

The transformation matrix Q is obtained iteratively. An arbitrary rotation $Q_0$ (see Equation (11)) is generated and applied prior to a sequence of individual plane rotations J, each about a pair of axes [u, v]. The sequence of plane rotations comprises multiple cycles through each of the possible choices of axis pairs. That is, $$Q = J_{u_d,v_d}(\theta_{fd}) \ldots J_{u_1,v_1}(\theta_{d+1}) J_{u_d,v_d}(\theta_d) \ldots J_{v_1,u_1}(\theta_1) Q_0 \quad \text{(Equation 11)}$$

where d=P(P−1)/2 is the number of unique axis pairs (i.e., for a 3×3 matrix d=3, for a 4×4 matrix d=6, and so on), f is the number of cycles through all axis pairs, and each $J_{u,v}(\theta)$ is a rotation by an angle θ about axes [u, v]. For example, $$J_{4,2}(\theta) = \begin{bmatrix} 1 & 0 & 0 & 0 \\ 0 & \cos(\theta) & 0 & \sin(\theta) \\ 0 & 0 & 1 & 0 \\ 0 & -\sin(\theta) & 0 & \cos(\theta) \end{bmatrix} \quad \text{(Equation 12)}$$

At the $n^{th}$ stage in the iteration, $\theta_1, \ldots, \theta_{n-1}$ are held fixed, and $\theta_n$ is determined by minimizing the sum of selected squared elements in all L matrices comprising $A'_l$. For example, in the hierarchical decomposition (or upper-triangular form) the residuals are minimized as follows:

$$R_{HD} = \sum_{l=1}^{L} \sum_{p=2}^{P} \sum_{q=1}^{p-1} \left[ (QA'_l Q^T)_{p,q} \right]^2 \quad \text{(Equation 13)}$$

Equation (13) refers to the residuals hierarchically decomposed by comparison to an upper-triangular canonical form (described in detail below). The CD process terminates when a full cycle of d iterations passes without further reduction of $R_{HD}$. In other words, termination occurs when all of the matrices comprising $A'_l$ are concurrently transformed to be as close as possible to an upper-triangular canonical form. If the sources of the original system can be cast in a hierarchical form (e.g., upper-triangular form), this transformation returns a new set of upper-triangular matrices, $A_{HD}$; for other systems, this procedure yields matrices $A_{HD}$ that are as nearly upper-triangular as possible, in the sense that $R_{HD}$ has reached the minimum attainable value.

While equation (13) refers to the residuals of the hierarchical form $R_{HD}$ as they relate to hierarchical decomposition (e.g., upper-triangular form), it should be noted that the residual equations can be generalized for other canonical forms $R_{CD}$. A general reference for all $R_{CD}$, not just hierarchical canonical forms $R_{HD}$ would replace equation (13) with equation (14), as described below.

In the general case, at the $s^{th}$ stage in the iteration, $q_1, \ldots, q_{s-1}$ are held fixed, and $q_s$ is determined by minimizing the sum of the squares of selected elements in all L matrices comprising $A'_l$, where the choice of elements is determined by the canonical form being sought. That is, the quantity to be minimized, $R_{CD}$, is given by:

$$R_{CD} = \sum_{l=1}^{L} \sum_{p,q=1}^{P} [G_{p,q}(QA'_l Q^T)_{p,q}]^2 \quad \text{(Equation 14)}$$

$R_{CD}$ generically represents all canonical form residuals. Here, G is a matrix composed of 0's and 1's. G is derived from the canonical form being sought by placing a "0" at locations that contains an asterisk, and a "1" at locations that contain a "0" (see canonical forms above).

This process of minimization, by successive application of rotations $J_{u,v}(\theta)$, falls into the class of "direction set" methods. Direction set methods are a class of methods for minimizing a multivariable equation via uni-variable adjustments (not necessarily a rotation). Direction set methods entail sequential one-dimensional minimizations, e.g., determination of $\theta_{fd}$ about the axis pair $[u_d, v_d]$, of a multidimensional, e.g., d-dimensional, space. The sequence of axis pairs is chosen to cycle through all possible pairs of axes (i.e., for a 4×4 matrix, d=6 and the cycle [2, 1], [3, 1], [4, 1], [3, 2], [4, 2], [4, 3], [2, 1] . . . ). Numerical experimentation indicates that there is no particular advantage to any sequence, provided that each axis pair is examined once per cycle. (In general, however, direction set methods tend to be more efficient when the gradient of the function is used to guide the sequence.) As with any multidimensional minimization, there is a risk of being trapped in a local minimum. While simulated annealing methods could be used to ensure that the global minimum is found, it is sufficient simply to run several minimizations in parallel, each preceded by a different initializing transformation $Q_0$ chosen from a collection of well-spaced transformations.

The transformation Q that attains the global minimum for $R_{HD}$ is subsequently used to transform the temporal components T', thereby identifying components $T_{HD}$=QT'. In the case that an upper-triangular canonical form is used, each component is, as nearly as possible, influenced only by itself and the more dominant components in the hierarchy. This is in accordance with an upper-triangular canonical form.

FIG. 8 is a schematic overview of a system for performing the CD technique in accordance with the present invention. The system includes a computer 850 that comprises a processor 860 and a memory device 870. Although the processor and memory device are shown as two separate components they may be combined into a single component. In addition, the system may be modified to include more than one memory device. Data is received as input by the computer 850 and stored in the memory device 870. Processing in accordance with the steps shown and described with respect to FIG. 6 is performed by the processor 860 on the input data. The transformation of the decorrelated MLAR model that best conforms to one or more canonical forms is output from the computer.

A description will now be provided for assessing the degree of hierarchical structure that is within any set of MLAR model coefficients. For any set of MLAR model coefficients of definition F (where F is A, A' or $A_{HD}$, representing the components, the decorrelated components, and the hierarchical components, respectively), the sum of all squared elements is:

$$R_{TOTAL} = \sum_{l=1}^{L} \sum_{p=1}^{P} \sum_{q=1}^{P} F_{p,q,l}^2 \quad \text{(Equation 15)}$$

The size of the decoupled portion of the MLAR model (i.e., the extent to which the components' dynamics are independent) is summarized by the sum of squared elements on the diagonal in all matrices comprising $F_l$:

$$R_{DIAG} = \sum_{l=1}^{L} \sum_{p=1}^{P} F_{p,p,l}^2 \quad \text{(Equation 16)}$$

The size of the hierarchical dynamic relationships in an MLAR model is summarized by the sum of squared elements above the diagonal in all matrices comprising $F_l$:

$$R_{UPPER} = \sum_{l=1}^{L} \sum_{p=1}^{P-1} \sum_{q=p+1}^{P} F_{p,q,l}^2 \quad \text{(Equation 17)}$$

The size of the dynamic relationships that are "anti-hierarchical" (i.e., neither hierarchical nor independent) is equal to the sum of squared elements below the diagonal in all matrices comprising $F_l$:

$$R_{LOWER} = \sum_{l=1}^{L} \sum_{p=2}^{P} \sum_{q=1}^{p-1} F_{p,q,l}^2 \quad \text{(Equation 18)}$$

Thus, $R_{TOTAL}=R_{DIAG}+R_{UPPER}+R_{LOWER}$. These four quantities will be used to compare the degree of independent and hierarchical drive or dominance in the various MLAR models at each stage of analysis described above. $R_{TOTAL}$ before and after the transformation identified by CD must be unchanged, since this transformation is orthogonal. However, the stage of noise decorrelation may change $R_{TOTAL}$ because of the scale factor implicit in the transformation K. For this reason, the quantities $R_{DIAG}$, $R_{UPPER}$, and $R_{LOWER}$ are determined as fractions of $R_{TOTAL}$, referred to as the independent, hierarchical, and anti-hierarchical drives, respectively. Similar indices can be derived for other canonical forms, e.g., by modifying equation (18) to include the matrix elements selected by G.

The arbitrary order chosen for the principal and noise-decorrelated components will define one set of values for $R_{UPPER}$ and $R_{LOWER}$ for each MLAR model, and any reordering of those components potentially yields different sets of values. Thus, the P! permutations of those components may change the apparent percent of hierarchical drive or dominance in the system. To distinguish the degree to which any such permutation will lead to a more or less hierarchical model, versus the degree to which the CD method uncovers the inherent hierarchical structure in the system, the maximum value of $R_{UPPER}$ is used, where $R_{UPPER}$ is considered for all permutations of the components, for all models of the principal and noise-decorrelated components. This necessarily results in the minimum possible value for $R_{LOWER}$, and guarantees that $R_{UPPER} \geq R_{LOWER}$.

FIGS. 1A-1F illustrate the outcome of an exemplary series data set resolved using both prior art PCA methods and the CD method in accordance with the present invention. By way of example, a simulated system of three hierarchically related sources or components is created. In this simulated system of three hierarchically related time series data, a two-lag, L=2, hierarchical MLAR model is created, and each source is driven with independent Gaussian white noise input, generating three sets of time series data of length N=512.

FIGS. 1A and 1B illustrate the simulated system. As can be seen in FIG. 1A, the $A_{q,p,l}$ matrix of model coefficients is depicted. The model A represents a P×P×L three dimensional array of MLAR model coefficients. By way of example, FIG. 1A depicts a 3×3×2 array of model coefficients. P represents the three temporal components. Thus, each of the two matrices in the model A is a 3×3 arrangement. Another way of describing this structure is a dual 3×3 matrix structure with two planes stacked on top of one another. Each source produces its own MLAR coefficients at a lag L=1 and at a lag L=2. The MLAR coefficients for source 1 at lag L=1 are 1.41, 0.04, and 0.17. The MLAR coefficients for source 2 at lag L=1 are 0, 1.69, and 0.51. The MLAR coefficients for source 3 at lag L=1 are 0, 0, 0.67. Similarly, FIG. 1A depicts the MLAR model coefficients at lag L=2. The model coefficients at lag L=2 are −0.81, −0.2, and −1.02 for source number 1. The model coefficients at lag L=2 are 0, −0.81, −1.38 for source number 2. Finally, the MLAR model coefficients for source 3 at lag L=3 are 0, 0, and −0.81.

To ensure stability of the model, MLAR coefficients on the diagonal are obtained from polynomials of order L, in this case L=2, whose absolute value is less than "1." Coefficients in the upper-triangular portion of the MLAR matrices, corresponding to influences between sources, are randomly chosen from a Gaussian distribution with a mean of zero and variance of "1". (It can be shown that for a hierarchical system, off-diagonal coefficients do not effect stability.) FIG. 1B shows the three resulting time series of the simulated sources in FIG. 1A.

CD is used to resolve the multisource system into hierarchical components. FIG. 1C represents the transformed MLAR coefficients obtained by CD as applied to the data in FIG. 1B. FIG. 1D represents the time series associated with this transformed MLAR model in FIG. 1C. It should be noted that the time series of FIG. 1D more closely resembles the time series of FIG. 1B, than does FIG. 1F, thereby confirming that the CD method resolves the hierarchical structure of the original three sources. To within the numerical accuracy of the machine computation, the CD algorithm has achieved $R_{HD}=0$ corresponding to an upper-triangular (purely hierarchical) canonical form. The upper-triangular canonical form refers to a matrix which has nonzero elements only along the main diagonal and in locations to the right of the main diagonal are zero. As seen in FIG. 1A the only zero elements are to the left of the main diagonal. The resolved components (FIG. 1D) are substantially identical to the original sources, disregarding signal polarity. It should be noted that the amplitudes of the extracted components also match the original sources because equal-variance noises are chosen as the driving terms.

By comparison, the PCA-derived components displayed in FIG. 1F (along with their corresponding MLAR coefficients in FIG. 1E) are remarkably dissimilar from the original components in FIG. 1B and MLAR coefficients in FIG. 1A. Each component contains a mixture of frequencies, and their interactions, as summarized by the MLAR coefficients in FIG. 1E do not reveal a recognizable hierarchical structure. Thus, FIGS. 1E and 1F demonstrate the deficiency of the PCA system. The PCA resolved system fails to distinguish the hierarchical relationship of the underlying sources.

It is possible to visualize the search for the transformation matrix Q for a 3-dimensional system by creating a representation of the possible 3-dimensional transformations. To construct this representation of the rotation space, it is recognized that any 3-dimensional transformation is specified by an angle of rotation θ from 0 to II around a unique axis in space. Thus, a 3-dimensional transformation can be represented as a point r in a solid sphere, wherein the direction from the center of the sphere to r indicates the axis of the rotation, and the length of this vector is θ. FIG. 2 shows an exemplary representation of the transformation space used to examine the global behavior of the residual values $R_{HD}$ for the example in FIGS. 1A-1F. Notice that there is a local minimum in the neighborhood of the global minimum that provides a potential trap for the CD minimization algorithm. The algorithm may become "trapped" by selecting a low point (local minimum) which is not the lowest point (i.e., the global minimum). The algorithm in accordance with the present invention overcomes this "tap" by varying the transformations to identify the lowest point.

A second example shown in FIGS. 3A-3F consists of a system with three dependent sources in which the autoregressive coefficients are only nonzero for a single lag (L=1). FIG. 3A, depicts this $A_{q,p,l}$ matrix. In this instance, the P×P×L three dimensional array of model coefficients is a 3×3×1 array because the lag L=1 and again P=3, as depicted. FIGS. 3B, 3D, and 3F show the respective time series and autoregressive coefficients of 3×3×1 MLAR model coefficient array in FIGS. 3A, 3C, 3E, respectively. Application of the CD algorithm again results in a hierarchical form represented by the upper-triangular canonical form because the nonzero coefficients of FIG. 3C are located along the diagonal and upper right of the matrix. Also, the PCA derived coefficient model shown in FIG. 3E, lacks any hint of the underlying hierarchical source structure. The time series in FIG. 3D, derived using the CD method of the present invention, more closely follows that of the time series of the original sources seen in FIG. 3D than does the time series of FIG. 3F.

Applying the CD method when lag L=1, results in a deficiency as depicted FIGS. 4A and 4B. In particular, a plurality of minima are presented that could represent the hierarchical relationship of the underlying sources. Despite the deficiency, the CD method still narrows down the possible models of the systems to a discrete, non-unique set of size P! (where P is the number of sources). In particular, for a generic P-component system, there are P! rotations Q that result in $R_{HD}=0$. These transformations correspond to the P! orderings of eigenvalues along the diagonal of the matrix $QA'_lQT$. This lag L=1 degeneracy does not occur with lag L=2, since transformations Q that make QA'₁QT triangular do not necessarily make QA'₂QT triangular. If the MLAR model has 2 lags the CD decomposition is unique.

While FIGS. 1A-4B demonstrate system responses with dependent sources, FIGS. 5A-5F illustrate system responses with independent sources. As mentioned above, the present invention can resolve both independent and dependent systems adeptly, whereas prior art systems could only resolve independent systems properly. The simulated independent source MLAR coefficients and time series are respectively shown in FIGS. 5A and 5B. Simulating independence, the two-lag L=2 MLAR model has non-zero terms only on the diagonal as shown in FIG. 5A. As mentioned above, this refers to the diagonal canonical form. The time series (N=512) and MLAR coefficients from the example shown in FIGS. 5A-5F are in the same format as FIGS. 1A-1F. Because PCA is used as a first step in the present invention's method of analysis, it is not surprising that the unrotated coefficients A in the MLAR model (FIG. 5E) are very nearly diagonal in form. Because PCA resolves instantaneously independent sources, (i.e., independent instantaneously and at lags L-1,2) the remaining steps in the present invention result only in relatively small changes to $A_{q,p,l}$ compared to FIGS. 1A-1F. PCA orders components by descending order of the magnitude of their eigenvalues. The relatively small changes made by CD in the value of off-diagonal elements reorders these components, in an arbitrary order, for independent time series. If sources are independent, their order of arrangement is irrelevant since they have no relation to each other. In the figures, this is clear because the matching tracings are not always the top, middle, or bottom line in the figure. For example, the bottom trace of FIG. 5B corresponds to the middle trace of FIG. 5D.

The following are some illustrative examples of various applications of the method and system of the present invention.

Medical and Life Sciences Research Applications

1. Brain Activity

A method in accordance with an embodiment of the invention can be used to analyze dynamic (time-dependent) measures of neural activity, including (but not limited to) the electroencephalogram (EEG), the local field potential (that may be recorded from cortical or subcortical structures), the magnetoencephalogram (MEG), optical imaging via intrinsic signals or voltage-sensitive dyes, functional magnetic resonance imaging (fMRI) and positron emission tomography (PET). EEG, MEG, and optical imaging yield tens to hundreds of time series (one for each electrode channel or detector) sampled around 10-250 Hz, while fMRI and PET yield thousands to millions of time series (one for each voxel) sampled at 0.5-5 Hz (fMRI) or 0.1 to 0.5 Hz (PET). The time series are direct or indirect measures of population neural activity of groups of neurons that are interconnected through dynamic neural networks. By analyzing these multi-variate time series using this method, we can determine the degree to which neuronal groups are canonically interrelated (e.g. hierarchically organized or cyclically related).

Understanding and characterizing the canonical relationships between neuronal groups may aide in the diagnosis of aberrant network signatures, such as those seen in epileptic seizures, schizophrenic hallucinations, and partial loss-of-consciousness. With real-time implementation of this method it may be possible to predict the onset of disturbances in neural circuitry, and to use these predictions to trigger implanted devices intended to control or prevent such disturbances. Real time implementation of the method of the present invention may be used, for example, to guide prosthetics for treatment of chronic cognitive disabilities and other neurological conditions.

In one example, CD in accordance with the present invention and in which the canonical form sought was hierarchical (upper-triangular) was used to reanalyze ictal electrocorticographic (ECoG) records. In the analysis of ECoG data, neither the number nor the time course of the underlying source was known in advance. Therefore, the P components were selected that constitute most of the original signal variance to assess the degree of the resolved hierarchical structure and the dynamics of each component. Traditional AIC was used to determine the order or lags L of the MLAR models. Application of a stricter AIC that doubles the relative weighting of the number of degrees of freedom typically reduces the model order L by one but does not otherwise significantly alter the results (data not shown). Since individual seizure sources are commonly thought of as cyclic (i.e., roughly periodic in time), the hierarchical relationship between sources sought is by no means in contradiction to this view. That is, sources that are related to each other in a hierarchical relationship may nonetheless be cyclic in time.

Table 1 is a summary of exemplary results that show the degree of hierarchical and independent structure in all components derived from icictal ECoG records in four patients.

TABLE 1

| | Principle Components | | | | Noise-Decorrelated Components | | | | Hierarchical Components | | | |
|---|---|---|---|---|---|---|---|---|---|---|---|---|
| | % $R_{DIAG}$ | % $R_{UPPER}$ | % $R_{LOWER}$ | % $R_{UPPER}/R_{LOWER}$ | % $R_{DIAG}$ | % $R_{UPPER}$ | % $R_{LOWER}$ | % $R_{UPPER}/R_{LOWER}$ | % $R_{DIAG}$ | % $R_{UPPER}$ | % $R_{LOWER}$ | % $R_{UPPER}/R_{LOWER}$ |
| Patient 1 | | | | | | | | | | | | |
| Seizure 1 | 89.6 | 8.7 | 1.7 | 5.2 | 97.2 | 1.8 | 1.1 | 1.6 | 98.5 | 1.2 | 0.4 | 3.2 |
| Seizure 2 | 69.8 | 26.2 | 4.0 | 6.5 | 84.4 | 10.6 | 5.0 | 2.1 | 97.4 | 2.3 | 0.3 | 8.3 |
| Seizure 3 | 84.6 | 12.8 | 2.7 | 4.8 | 88.8 | 7.7 | 3.5 | 2.2 | 95.9 | 3.4 | 0.7 | 4.7 |
| Patient 2 | | | | | | | | | | | | |
| Seizure 1 | 82.5 | 11.9 | 5.6 | 2.1 | 84.1 | 10.8 | 5.1 | 2.1 | 88.3 | 9.9 | 1.8 | 5.4 |
| Seizure 2 | 93.2 | 6.3 | 0.6 | 11.3 | 96.7 | 2.4 | 0.9 | 2.6 | 98.1 | 1.8 | 0.1 | 14.7 |
| Seizure 3 | 94.3 | 4.4 | 1.3 | 3.4 | 96.0 | 2.5 | 1.5 | 1.7 | 96.2 | 3.6 | 0.2 | 16.3 |
| Patient 3 | | | | | | | | | | | | |
| Seizure 1 | 93.6 | 4.9 | 1.5 | 3.3 | 94.4 | 4.0 | 1.6 | 2.5 | 95.4 | 4.1 | 0.5 | 8.5 |
| Seizure 2 | 99.7 | 0.2 | 0.1 | 4.0 | 99.8 | 0.2 | 0.0 | 5.6 | 99.8 | 0.2 | 0.0 | 10.4 |

TABLE 1-continued

| | Principle Components | | | | Noise-Decorrelated Components | | | | Hierarchical Components | | | |
|---|---|---|---|---|---|---|---|---|---|---|---|---|
| | % $R_{DIAG}$ | % $R_{UPPER}$ | % $R_{LOWER}$ | % $R_{UPPER}/R_{LOWER}$ | % $R_{DIAG}$ | % $R_{UPPER}$ | % $R_{LOWER}$ | % $R_{UPPER}/R_{LOWER}$ | % $R_{DIAG}$ | % $R_{UPPER}$ | % $R_{LOWER}$ | % $R_{UPPER}/R_{LOWER}$ |
| Patient 4 | | | | | | | | | | | | |
| Seizure 1 | 96.3 | 2.9 | 0.8 | 3.7 | 98.8 | 0.8 | 0.4 | 1.9 | 99.7 | 0.2 | 0.0 | 13.3 |

The three vertical sections in Table 1 represent components derived using PCA analysis, (section 1), noise decorrelation (section 2), and hierarchical decomposition (section 3). Examination of Table 1 indicates that the components resolved by CD are both proportionally more hierarchical (i.e., see the columns labeled "$R_{UPPER}/R_{LOWER}$" under each type of component) and more independently driven (i.e., see the columns labeled "% $R_{DIAG}$" under each type of component) than the components resolved by PCA. For example, the MLAR model coefficients of the principal components A in equation (3) obtained from the third seizure record of patient 2 are characterized by ~94.3% independent drive (% $R_{DIAG-PCA}$) and ~4.4% hierarchical influence (% $R_{UPPER-PCA}$), yielding a hierarchical to anti-hierarchical ratio ($R_{UPPER-PCA}/R_{LOWER-PCA}$) of 3.4 (section 1, sixth row, fourth column). By contrast, the MLAR model coefficients of the hierarchical components ($A_{HD}$) reveals that ~96.2% of the drive is independent (% $R_{DIAG-HD}$), ~3.6% is hierarchical (% $R_{UPPER-HD}$), and the ratio of hierarchical drive ($R_{UPPER}/R_{LOWER-HD}$) is 16.3 (third section, sixth row, twelfth column). Some, but not all, of this simplification of model structure is due to the reorganization of the model coefficients by the noise decorrelation procedure, which yields model coefficients A'. Also evident from Table 1 is the fact that reorganization of the components by noise decorrelation is partially responsible for this simplification of model structure.

For this example, noise decorrelation alone yielded ~96.0% independent (% $R_{DIAG-ND}$) and ~2.5% hierarchical drive (% $R_{UPPER-ND}$). But in most instances, noise decorrelation fails to identify a proportionally more hierarchical organization ($R_{UPPER-ND}/R_{LOWER-ND}$ is only 1.7), whereas CD extracts components that are both more independent (larger $R_{DIAG-HD}/R_{TOTAL-HD}$, all records) and proportionally more hierarchical (greater ratio of $R_{UPPER-HD}$ to $R_{LOWER-HD}$ in 7 of a total of 9 records), as detailed in Table 1. Nevertheless, there is also variability, both from patient to patient and within patient, in the degree of hierarchical relationship between the underlying seizure sources. Moreover, the contribution of each of the L coefficient matrices to the indices $R_{UPPER}$ and $R_{LOWER}$ are approximately equal in all cases (data not shown), most likely a consequence of the fact that the CD algorithm treats all L matrices equally.

Examination of the nonlinear dynamics present in the extracted components provides another means to interpret the results of the CD method. A NLAR fingerprint was used to assess the nonlinear dynamics in an individual time series. PCA decomposition of temporal lobe seizure records uncovers components whose nonlinear dynamics, as characterized by NLAR fingerprints, resemble those of the EEG during absence seizures. This approach identified common nonlinear dynamics between 3/second spike-and-wave seizure traces, and the principal components derived from the partial complex seizure records of patients 1 and 2.

FIGS. 7A-7L are a comparison of the NLAR analyses of the PCA derived with that of CD derived components. Because the principal components exhibiting significant nonlinear characteristics account for relatively small fractions of the original signal variance, the biological significance of the nonlinear signal was unclear. In contrast, CD analysis of these same records uncovers components containing the same nonlinearities, but they can appear relatively early in the hierarchy. In FIGS. 7A-7L, the percent of variance of the original signal that each component explains is shown by the height of the bar. (For PCA this necessarily decreases as the component number increases.) The significance of the nonlinear dynamics identified in each component, as summarized by N$\Delta$V/V, is shown by the corresponding point on a solid line (the dashed line indicates significant nonlinearities, N$\Delta$V/V=4). Whereas the principal components with the largest N$\Delta$V/V are typically those components that explain only a small fraction of the variance (leaving their significance unclear), CD analysis revealed that the hierarchical components with the greatest nonlinear structure can be the most autonomous components (lowest numbered component). This is seen in seizures 1 and 3 of patient 2.

This latter record is particularly striking because CD analysis uncovers a hierarchically derived component with significant nonlinearities (N$\Delta$V/V≈8) even though none of the PCA-derived components display significant nonlinear characteristics (N$\Delta$V/V<4). It is hypothesized that this reflects a more effective separation of underlying sources by CD, and that the components extracted by PCA reveal only diluted effects of the nonlinearity due to mixing. Additionally, five PCA components were retained for seizure 3 of patient 1. The fifth component, which is the first component of PCA shows significant nonlinearities, has an N$\Delta$V/V ≈5.2 but accounts for only approximately 3% of the variance. Here, CD analysis with five components exposes significant nonlinear characteristics in the third hierarchical component which accounts for nearly 50% of the original signal variance. Finally, it is noted that there are differences in the analyses of individual records within and across patients, both in terms of the relative sizes of the hierarchical components and in the CD components that demonstrate the greatest nonlinearities. It is suspected that these differences reflect physiologic differences in the events themselves rather than non-robustness of the analysis method, since (a) the records themselves appeared artifact-free, (b) the results of the analysis are not significantly altered by small changes in the model order, and (c) for systems in which the internal structure is known, CD provides an accurate decomposition.

The position of these nonlinearities in the hierarchy appears to be independent of the amount of original signal variance that these components explain. Furthermore, CD analysis helps to clarify the biological significance of these nonlinearities: they possibly reflect deep sources that contribute little to the surface EEG, but affect a large portion of the entire neural system. More generally, the CD analyses demonstrate that although the nonlinearities are not always a major contribution to the overall signal variance, they nevertheless may exert influence over all or most of the system.

In addition, the NLAR fingerprints of the hierarchical components support the connection between temporal lobe and absence seizures, and strengthen the suggestion that both seizure types may result from similar underlying neural mechanisms. Significant nonlinearities in these fingerprints appear in the vicinity of approximately 90 msec and approximately 150 msec., as is seen in the NLAR fingerprints of absence seizure traces, and as reported earlier for the NLAR fingerprints of the principal components. Notice, however, that the nonlinearities tend to be more statistically significant in the CD-derived components than in the PCA-derived components. Our findings may help explain why even focal temporal lobe seizures produce global alterations in awareness and behavior: the importance of a neural circuit in driving global brain activity (i.e., its position in the hierarchy) may be disproportionate to the fraction of the variance of the surface activity that it explains, especially for generators that are deep. The results of CD modeling are thus consistent with the notion that temporal lobe and absence seizures reflect alteration of selective circuit mechanisms that play a key role in forebrain integration. The application of the CD technique to ECoG records of temporal lobe epilepsy suggests that there is an interpretive benefit gained by extracting hierarchical, rather than independent, components. This approach may be generalized using CD to aid system identifications in other contexts where reverse engineering applications are desired. For example, evaluation of designed systems with hidden internal structure monitored across multiple data channels (e.g. multiple telemetry signals sampling the behavior of a tracking system). Another example is in system identification of electronic circuits, the exact approach carried out on ictal data in this example could be used to examine outputs of an electronic circuit of unknown design.

2. Episodic Clinical Events

A method in accordance with an embodiment of the invention may be used to analyze polygraphic biomedical series, to improve diagnosis of episodic clinical events, such as syncopal and presyncopal episodes, whose origin (i.e., cardiac vs. respiratory vs. cerebral) is unclear. In this application, the original channels of data may consist of polygraphic recordings, including heart rate, respiratory rate, pulse oximetry, and an index of EEG activity, such as the fraction of power in the delta-frequency band. This time series data may be extracted from ambulatory telemetry recordings, such as that collected by a 24-hour data cassette recorder worn by the patient. After the data is sampled, a canonical form may be chosen. For example, the first component (row) of the upper-triangular canonical form (i.e. hierarchical form) may be identified as the prime mover. The transformation between the original data channels and the derived channels is inspected to determine the similarity of this prime mover to the cardiac, respiratory, or cerebral signals. By identifying a similarity of this prime mover to physiologic channels of known origin, the diagnosis of the origin of the abnormal clinical events may be improved.

3. Cardiac Arrhythmias

A method in accordance with an embodiment of the invention can also be used to analyze multi-channel electrocardiographic records (EKG) to improve the treatment of life-threatening cardiac arrhythmias. In this application, the original channels of data may consist of multiple EKG channels (typically 8 to 16 channels), obtained from surface recordings and/or invasively (from pacemakers, AICDs, or during provocative testing) during and just preceding periods of ventricular arrhythmia. The canonical forms may include, for example, both a single triangular hierarchy and multiple triangular hierarchies (i.e., 2 or more blocks). The extent to which the time-series can be accounted for by each of the canonical forms may be compared. This provides an objective way to distinguish arrhythmias with a single functional origin from arrhythmias with multifocal origin. Improved medical and possibly surgical therapy can be based on this distinction. Additionally, if (via existing single-channel analyses) particular features can be identified in the prime mover channel(s), a real-time implementation of the method can provide an improved means of predicting arrhythmias, thus leading to adjustments in medical therapy or triggering a defibrillation device.

4. Gene Chip Data

A method in accordance with an embodiment of the invention can be used to analyze data derived from gene chip arrays or other devices that provide a time series of the expression of multiple genes or the level of synthesis of proteins. In this application, the original channels of data may consist of these records of gene or protein expressions obtained during biologically significant events, such as sporulation, alterations in metabolism, or stages of the cell cycle. Data sampling rates may be limited by data acquisition technology, and is expected to be on the order of one sample per minute or slower. Canonical forms may include block triangular hierarchies and block cyclic structures. The groupings of the original data channels into each of the blocks may be compared to establish possible functional relationships between the genes and/or proteins. It is widely recognized that analysis of the extraordinary amount of data available from such microarrays (thousands of expression records) to identify functional relationships and patterns of co-regulation is a major challenge. The method of the invention provides a new, general, and objective approach to identify such relationships, complementary to prior art approaches currently in use, that are based on examination of genetic sequences. It thus may benefit gene chip approaches to major medical problems, including microbial drug resistance, and genetic risk factors in human disease.

Meteorological Applications

1. Wind and Currents

A method in accordance with an embodiment of the invention can be used to analyze geophysical data for the purpose of improved prediction of geophysical phenomena characterized by complex dynamics. Wind velocity and oceanic currents have complex dynamics due to the nature of the governing fluid dynamics equations (e.g., Navier-Stokes). A direct attempt to forecast via these equations requires a very dense sampling of data, and is highly sensitive to errors in data acquisition. Thus, despite knowledge of the governing physical laws, accurate forecasting remains problematic. The present method provides a way to improve prediction based on identification of patterns in these complex datasets rather than a direct attempt to forward-integrate the governing equations. In this application, the original channels of data may consist of multiple records of atmospheric or oceanic data, such as wind or water velocity at multiple sites. Each such site and modality may provide three channels of data, corresponding to the velocity components along three dimensions of space. Additional channels such as barometric pressure may be included. Data may be sampled at a rate, for example, on the order of several times per day, or as limited by the data acquisition technology. The canonical forms may consist of block triangular and cyclic forms. Prime movers may be identified and existing methods of nonlinear analysis and prediction may be applied. Prediction of accurately identified prime mover channels will result in improved prediction of the entire spatiotemporal data set (i.e., weather, currents, and related geophysical phenomena), with economic benefit to human activities that are influenced by these phenomena, such as trade.

Business Applications

1. Financial Time Series Applications

A method of canonical CD in accordance with an embodiment of the invention may be used to analyze interdependent relationships among financial time series, particularly where related methods employing Granger causality or nonlinear dynamical analyses have demonstrated unique relationships or system diagnostic utility. For example, asset-pricing relations may represent one class of time-dependent financial variables to which CD may be applied. Nonlinear feedback has been identified between stock price relations and macroeconomic pricing factors that implied complex underlying dynamics between macroeconomic variables and stock returns. Given this nonlinear feedback relationship, CD may be applied to explore large data sets of many stock prices (or calculated returns) either as multi-variate time series, or optionally as sectors or grouped by data reduction methods (e.g., using PCA or ICA). Extraction of dynamic influences of particular macroeconomic variable and particular stocks, sectors or groups, may provide information useful for risk assessment, market efficiencies, or forecasting when used in combination with other methods. Particular canonical forms that may be of significant practical value in this context may include triangular forms (and variations), e.g., driving of several stocks by a particular macroeconomic variable such as price of particular currency or periodic processes (e.g., seasonal variations, business cycles).

CD analysis into canonical forms may identify other unique dynamical relationships among multi-channel financial data sets. For example, many assets, e.g., government bond futures, commodities, and short interest rate futures, have rapid daily price changes that show strong autocorrelations of their absolute value but not autocorrelation per se. Such relationships may be uncovered in the canonical transformed signals and allow new inferences to be drawn, e.g. interrelationships, of these variables and determinants of market volatility. Financial time series with non-Gaussian statistics can be approached as outlined in "I. Brain activity" utilizing NLAR or other nonlinear dynamical analysis methods in combination with CD. These examples are meant only to illustrate the range of applications of CD to financial data and are illustrative but are in no way meant to restrict the use of the algorithm within financial analysis.

Application to Inventory Management

A method in accordance with an embodiment of the invention may also be used to analyze levels of input inventory and output inventory to improve the management of various assets within any type of business, including those characterized by services, processes or products. In this application, the original channels of data may include (time-series) measurements of: inventory levels in one or multiple types of assets; historic, current or predicted sales or depletion levels of the final product; historic, current or planned pricing levels of the final product; historic, current or predicted supply levels of inputs; historic, current or predicted pricing levels of inputs; historic, current and predicted shipping costs; historic, current and predicted physical space availability and cost; or other potentially relevant business and economic data. A triangular or cyclic canonical form (for a single product, process, or service) or a block form with multiple triangular and cyclic hierarchies (for multiple products, processes, or services) may be chosen. Extraction of dynamical influences or particular data sets may prove useful to improve the efficiency of input and/or output inventory management, thereby providing an improvement in cost reduction, profitability, or product availability to targeted markets.

Application to Routing

A method in accordance with an embodiment of the invention can also be used to analyze routing data to determine the improved routing for the physical movement of forms of transportation or the movement of goods and services. For example, this method can be applied to any mode of transportation, such as but not limited to, routing trucks, airplanes, shipping and trains. The original channels of data may include a variety of time-series data sets depending on the optimization objectives. In this example, data may include weather patterns, length and logistics of previous trips, equipment service logs, availability of equipment, personnel schedules and availability, operational costs and availability such as for fuel or landing, demand for the goods or services delivered. Other examples include the movement of goods and services, such as the movement of oil or natural gas through pipelines, the supply and delivery of power and utilities, or the delivery of mail. A block canonical form with one or more triangular and cyclic hierarchies may be chosen. The problem presented for improved resolution here is a classical operations management problem. Historical methods attempting to address this problem may not account for the dynamic interactions of these logistical factors; these interactions are concisely characterized by this method.

Application for Determining the Path of Transmission of Data

A method in accordance with an embodiment of the invention can also be used to analyze and determine the alternative and optimal paths for the transmission of data over networks, such as electronic, fiber optic, electromagnetic (wireless, satellite, AM and FM) networks or any combinations of these. For example, on the internet, as networks for data packets, or other technologies, become choked with increased internet traffic, the need for determining improved efficiency in routing has become apparent. In this application, channel data may consist of the number of pieces of various equipment deployed, the number of data packets to send, the number of other data packets competing for the networks available, and the status of availability of the networks. A block canonical form with one or more triangular and cyclic hierarchies may be chosen. Prediction of traffic loads, and consequent efficient deployments of communications resources and routing, may lead to improved speed of data transmission and/or lower cost for network communications equipment.

Application for Control of Process, Assembly, Manufacturing, and Service Procedures The method of the invention may be used to analyze the measurements recorded over time in process, manufacturing, and assembly plants to measure, adjust and control production. In this application, channel data will consist mainly of time-series data measured and recorded during different, selected stages of production. For example, depending on the procedure, such data may include but is not limited to measurements of size, temperature, viscosity, weight and shape. Data may be measured or recorded by human or automated methods. A block canonical form with one or more triangular hierarchies may be chosen. Based on the present analysis, feedback information may be generated and used in "realtime" and over time to monitor the procedure so that any action can be taken to adjust the procedure to create a particular type of output and so that sources of defects can be identified and corrected at the source of the problem.

Application for Determining Quantity and Type of Inputs and Outputs in a Manufacturing, Process, Assembly or Service Procedure A method in accordance with an embodiment of the invention may also be used to analyze the number, type and ratio of inputs and outputs in any procedure, including those for manufacturing, processes, assembly or service procedures, to improve these procedures. One example of this application is recording and analyzing the steps in the procedure of offering airline service to passengers in order to improve that service. In this particular application, channel data can consist of time-series data sets including passenger's characteristics, such as demographic data and the passengers' experiences with airlines, the number and type of airline personnel available to serve a flight from selling the ticket to delivering the baggage, airport gate availability, airline equipment availability, weather patterns, and experience with the FAA. By analyzing these data, including quality and type of inputs, using this method, the airline can improve its service. Another example is in the manufacturing sector, in which a company sources identically specified parts from multiple suppliers. Although the parts are identically specified, because they are manufactured by more than one supplier perhaps manufactured at more than one plant within one supplier, and produced at different points in time, they may differ enough to create various numbers and qualities of outputs. Data sets can be created concerning these inputs and their interaction with other inputs throughout the stages of the manufacturing procedure to improve the output.

Application to User-Machine Interfaces

A method in accordance with an embodiment of the invention can be used to analyze and improve the interaction between a combination of humans and/or machines, such as computerized or automated machines. Original data channels may vary according to the application. For example, in the case of a person ("visitor") interacting with an internet website on his computerized device (e.g., computer, telephone or any other appliance), information can be gathered about the visitor from data that the visitor's behavior during visits on the website, from what the website has obtained in some other manner or from data collected concerning other visitors. In this example, each channel may correspond to a web page or functional subsection of a page, and the data analyzed may include the number of hits on each web page within a website or linked to another website during a given time period. The canonical form to be used may be dictated by the pattern of connectivity of the website. These time series data sets, analyzed, may improve interaction and communication between the visitor and the website by suggesting probabilities or conclusions to the website of what the visitor will want or need next based on the visitor's data and possibly that of other people. In the case of a commercial website, the application of this method may improve marketing or customer service.

Application to Marketing and Business Planning

This method can be used to analyze information gathered from any medium to determine patterns of data that can improve marketing or the gathering and dispersal of information by a company, industry or any other organization (e.g., government polls). The original channels consist of datasets gathered over time measuring various selected characteristics of a chosen population. Examples of data sets may include income levels of customers, number of products purchased, price levels, and demographic characteristics of customers. A block form with one or more triangular and cyclic hierarchies may be chosen. This analysis may be able to detect patterns of consumer behavior not identifiable by conventional methods so that both a company's products and marketing process may be improved.

Application to Seismic Data

A method in accordance with an embodiment of the invention may be used in the analysis of seismic data resulting from the propagation of acoustic (shock) waves whether subterranean or submarine. Applications may include geological mapping for natural resource exploration or earthquake prediction. In the case of earthquake prediction, the original data channels may consist of time series of seismic recordings at various locations over a prescribed area. The canonical forms may consist of a triangular form or a block form with multiple triangular hierarchies, The spatial parameters associated with the sources identified by this procedure may serve to identify active geologic areas for resource exploration and the time series associated with these sources may be used to analyze the shift or change in geological formations.

It will be appreciated by persons skilled in the art that the present invention is not limited to the specific embodiments described above with reference to the accompanying drawing. Rather, the scope of the present invention is limited only by the following claims:

The invention claimed is:

1. A computer-assisted method of determining dynamic characteristics of data, the data being causal and having translation-invariant statistics with respect to a variable, which method comprises the steps of: receiving signals representing the data, the signals originating from a set of components, the set of components having dynamic relationships with each other; calculating a set of multi-linear autoregressive coefficients of the data, the multi-linear autoregressive coefficients yielding an array of square matrices, each square matrix reflecting the dynamic relationships among the components for a certain value of the variable; storing the array of square matrices in a memory of a computer; transforming each square matrix to a substantially canonical form corresponding to a selected canonical form suitable for analyzing the dynamic relationships, yielding a set of canonical form matrices representing a transformation of the components; analyzing the selected canonical form and transformed components to determine the dynamic characteristics of the data with respect to the variable; and means for outputting the transformation of the components from the computer.

2. A method according to claim 1, wherein the dynamic relationships are hierarchical.

3. A method according to claim 1, wherein the dynamic relationships are dependent.

4. A method according to claim 1, wherein the dynamic relationships are independent.

5. A method according to claim 1, wherein the dynamic relationships are partially dependent and partially independent.

6. A method according to claim 1, wherein the receiving step further comprises applying a data reduction method to the data.

7. A method according to claim 6, wherein the data reduction method comprises Principal Component Analysis.

8. A method according to claim 1, wherein the variable is time.

9. A computer-assisted method for determining an orthogonal rotation for analyzing data, the data being causal and having translation-invariant statistics with respect to a variable, the data originating from a set of components, the set of components having dynamic relationships to each other, which method comprises the steps of: creating a multi-variate linear autoregressive model of the data, the model describing influences of one component on another component with respect to the variable; storing the model in a memory of a computer; decorrelating random terms in the model so that the decorrelated random terms are orthogonalized to produce a new model with autoregression coefficients, the random terms driving channels of the components; identifying an orthogonal rotation that preserves the influences from the creating step and the orthogonality of the random terms from the decorrelating step, and that transforms the new model with autoregression coefficients into a canonical form; and a means for outputting the transformation of the components from the computer.

10. A method according to claim 9, wherein the creating step further comprises performing data reduction on the data.

11. A method according to claim 10, wherein the data reduction performed is Principal Component Analysis decomposition.

12. A method according to claim 9, wherein the components are temporal, $T_{p,n}$, and are modeled according to:

$$T_{p,n} = R_{p,n} + \mu_p + \sum_{q=1}^{P} \sum_{l=1}^{L} A_{q,p,l} T_{q,n-l}$$

whereby, P represents principal components; L represents a predetermined number of lags; N represents a total number of samples of the data observed at evenly spaced intervals; $R_{p,n}$ is a matrix of residual values of dimension P×N; $u_p$ is a mean value of a pth component; A is a three dimensional array of model coefficients of dimension P×P×L, and n is a particular sample or interval of time.

13. A method according to claim 9, wherein a set of residuals $R_{MLAR}$ is calculated according to:

$$R_{MLAR} = \sum_{p=1}^{P} \sum_{n=1}^{N} R_{p,n}^2$$

whereby, N represents a total number of samples of the data observed at evenly spaced intervals; and P represents principal components.

14. A method according to claim 9, wherein the canonical form has zero and nonzero elements, the nonzero elements being located in positions only along the main diagonal and anywhere at locations right of the main diagonal.

15. A method according to claim 9, further comprising predicting future dynamic characteristics of the data using the canonical form.

* * * * *

UNITED STATES PATENT AND TRADEMARK OFFICE
CERTIFICATE OF CORRECTION

| | | |
|---|---|---|
| PATENT NO. | : 7,409,321 B2 | Page 1 of 1 |
| APPLICATION NO. | : 11/463728 | |
| DATED | : August 5, 2008 | |
| INVENTOR(S) | : Repucci et al. | |

It is certified that error appears in the above-identified patent and that said Letters Patent is hereby corrected as shown below:

In column 26, line 5, in Claim 12, delete "$u_p$" and insert -- $\mu_p$ --, therefor.

Signed and Sealed this

Eleventh Day of November, 2008

JON W. DUDAS
*Director of the United States Patent and Trademark Office*